United States Patent [19]
Bauer et al.

[11] 3,914,216
[45] Oct. 21, 1975

[54] 1-PHENYL-3H-1,4-BENZODIAZEPINE-2,5-(1H,4H)-DIONES

[75] Inventors: Adolf Bauer, Ingelheim am Rhein; Karl-Heinz Weber, Gau-Algesheim; Peter Danneberg, Ockenheim; Franz-Josef Kuhn, Bingen, Rhine, Germany

[73] Assignee: Boehringer Ingelheim GmbH, Ingelheim am Rhein, Germany

[22] Filed: Nov. 8, 1973

[21] Appl. No.: 413,795

Related U.S. Application Data

[63] Continuation-in-part of Ser. No. 316,266, Dec. 18, 1962, abandoned.

[30] Foreign Application Priority Data

Dec. 29, 1971 Germany............................ 2165311

[52] U.S. Cl............................. 260/239.3 D; 424/244
[51] Int. Cl.²........................................ C07D 243/14
[58] Field of Search............................ 260/239.3 D

[56] References Cited
FOREIGN PATENTS OR APPLICATIONS 1,810,423  10/1969  Germany...................... 260/239.3 D
1,918,072  10/1970  Germany...................... 260/239.3 D

OTHER PUBLICATIONS

Iacobelli et al., "J Het. Chem." Vol. 2, pp. 323–325, (1965).

*Primary Examiner*—Norma S. Milestone
*Assistant Examiner*—Robert T. Bond
*Attorney, Agent, or Firm*—Hammond & Littell

[57] ABSTRACT

Compounds of the formula

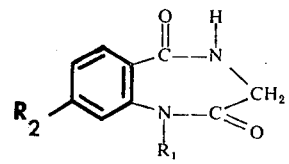

wherein
$R_1$ is phenyl, fluoro-phenyl, chloro-phenyl, bromo-phenyl, trifluoromethyl-phenyl or nitro-phenyl, and
$R_2$ is fluorine, chlorine, bromine, trifluoromethyl, nitro, amino, cyano or hydroxyl;
the compounds are useful as psychosedatives and anticonvulsives.

5 Claims, No Drawings

1-PHENYL-3H-1,4-BENZODIAZEPINE-2,5-(1H,4H)-DIONES

This is a continuation-in-part of copending application Ser. No. 316,266 filed Dec. 18, 1972 now abandoned.

This invention relates to novel 1-phenyl-3H-1,4-benzodiazepine-2,5-(1H,4H)-diones, as well as to methods of preparing these compounds.

More particularly, the present invention relates to a novel class of compounds represented by the formula

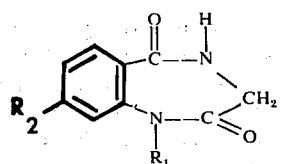

wherein
- $R_1$ is phenyl, fluoro-phenyl, chloro-phenyl, bromo-phenyl, trifluoromethyl-phenyl or nitro-phenyl, and
- $R_2$ is fluorine, chlorine, bromine, trifluoromethyl, nitro, amino, cyano or hydroxyl.

The compounds embraced by formula I may be prepared by the following methods:

Method A

By subjecting a compound of the formula

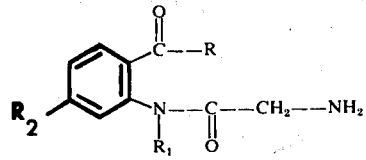

wherein
$R_1$ and $R_2$ have the same meanings as in formula I, and
R is hydroxyl, O-tosyl, lower alkanoyloxy, halogen or preferably lower alkoxy, to a ring closure reaction at room temperature or moderatley elevated temperatures in a conventional inert solvent medium, such as a lower alkanol, ethyl acetate, tetrahydrofuran or dimethylacetamide, and optionally in the presence of a condensation agent, such as sodium methylate, sodium bicarbonate or triethylamine.

The ring closure reaction may be applied either to an isolated compound of the formula II or to a reaction mixture containing a compound of the formula II which results from the reaction pursuant to the equation

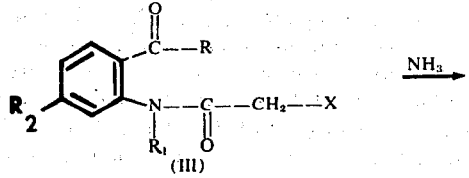

where R, $R_1$ and $R_2$ have the meanings previously defined and X represents a nucleophobic group which may readily be exchanged for the $NH_2$-group, such as chlorine, bromine, iodine, O-tosyl or lower alkanoyloxy. To form such a reaction mixture, a compound of the formula III is either introduced into liquid ammonia, or a solution of a compound of the formula III in an inert solvent medium, such as tetrahydrofuran, dioxane, dimethylformamide or methanol, is reacted with a compound which releases ammonia in solution, such as an ammonium salt or hexamethylenetetramine.

In those instances where it is desired to prepare an end product of the formula I wherein $R_1$ is o-substituted phenyl, it is preferred to perform the ring closure reaction in a closed autoclave where it proceeds to completion within a very short time at room temperature.

The starting compounds embraced by formula III are new, but they may be obtained by methods involving known chemical principles. For instance, a compound of the formula III wherein R is methoxy and X is chlorine may be obtained by the following reaction sequence:

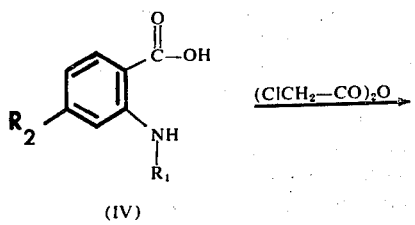

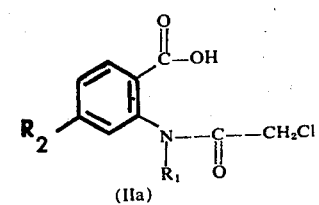

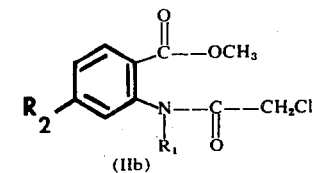

where $R_1$ and $R_2$ have the meanings previously defined. More particularly, this reaction is carried out by dissolving the o-phenylamino-benzoic acid IV in an inert organic solvent, such as benzene, toluene, xylene or dimethylformamide, refluxing the solution with chloroacetic acid anhydride, dissolving compound IIa thus obtained in a dilute lower alkanol, and adding a small excess of diazomethane to the solution to form compound IIb which is then reacted, as described above, with liquid ammonia or an ammonia-releasing compound to yield a compound of the formula II.

Method B

By oxidizing a benzodiazepinone of the formula

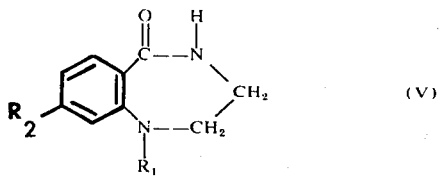

wherein $R_1$ and $R_2$ have the same meanings as in formula I, with a strong oxidizing agent, such as potassium permanganate, activated manganese dioxide or a mixture of chromic acid and sulfuric acid.

The oxidation with potassium permanganate or chromic acid/sulfuric acid is most advantageously performed in a water-miscible solvent medium which is itself not oxidized under the oxidation reaction conditions, such as acetone, methyl ethyl ketone, glacial acetic acid, dioxane, tetrahydrofuran or mixtures of any two or more of these.

The oxidation with activated manganese dioxide may also be performed in the presence of a substantially waterimmiscible organic solvent medium, such as ethyl acetate, diethyl ether, methylene chloride or chloroform.

In either case the optimum oxidation reaction temperature depends upon the particular starting compound of the formula V and may vary, in general, between 20,°C and the boiling point of the particular solvent medium which is employed.

A starting compound of the formula V may be obtained by subjecting a lower alkyl o-amino-benzoate of the formula

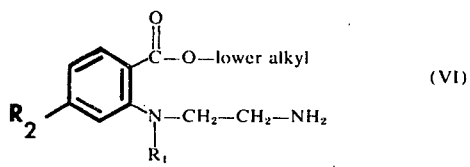

wherein $R_1$ and $R_2$ have the same meanings as in formula I, to a ring closure reaction as described in German patent application No. P 21 65 310, filed in West Germany on Dec. 29, 1971.

The following examples further illustrate the present invention and will enable others skilled in the art to understand it more completely. It should be understood, however, that the invention is not limited solely to the particular examples given below.

EXAMPLE 1

8-Nitro-1-phenyl-3H-1,4-benzodiazepine-2,5(1H,4H)-dione by method A a. 26 gm of 4-nitro-N-phenyl-anthranilic acid were dissolved in 500 ml of absolute benzene, 26 gm of chloroacetic acid anhydride were added to the solution, and the resulting mixture was refluxed for 1 hour. Thereafter, the reaction mixture was extracted several times with water, and the organic phase was dried over magnesium sulfate and then vacuum-filtered. The filtrate was evaporated in vacuo, and the residue was recrystallized from isopropyl ether/cyclohexane; yielding 30 gm (98% of theory) of N-chloroacetyl-N-phenyl-4-nitroanthranilic acid, m.p. 172°–173°C.

b. 10 gm of N-chloroacetyl-N-phenyl-4-nitroanthranilic acid were dissolved in a mixture consisting of 1 liter of methanol and 100 ml of water and, while stirring the solution, a slight excess of diazomethane dissolved in ether was added over a period of ten minutes. Thereafter, the reaction solution was evaporated to dryness in vacuo, and the residue was recrystallized from methanol, yielding 10 gm (97% of theory) of methyl N-chloroacetyl-N-phenyl-4-Nitroanthranilate, m.p. 126°–127°C.

c. 9 gm of N-chloroacetyl-N-phenyl-4-nitroanthranilic acid were dissolved in 150 ml of acetone, the solution was admixed with 8 gm of potassium iodide, and the resulting mixture was stirred for 20 hours at room temperature. Thereafter, the reaction solution was evaporated in vacuo, the residue was admixed with water, the aqueous mixture was extracted with ethyl acetate, and the organic phase was dried with magnesium sulfate and then evaporated in vacuo. The residual oil was dissolved in 20 ml of methanol, the resulting solution was admixed with 200 ml of liquid ammonia, and the mixture was allowed to stand for 1 hour and was then poured over ice. The aqueous mixture was now neutralized with glacial acetic acid and subsequently extracted several times with ethyl acetate. The combined organic extracts were admixed with activated charcoal, dried and vacuum-filtered, the filtrate was evaporated in vacuo, and the residue was recrystallized from acetonitrile, yielding 4.9 gm (64% of theory) of the compound of the formula

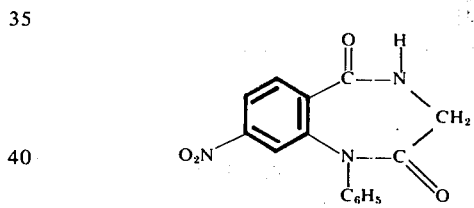

which had a melting point of 222°–223°C.

EXAMPLE 2

8-Trifluoromethyl-1-phenyl-3H-1,4-benzodiazepine-2,5-(1H, 4H)-dione by method A 25 gm of N-chloroactyl-N-phenyl-4-trifluoromethylanthranilic acid [prepared from 4-trifluoromethyl-N-phenylanthranilic acid analogous to Example 1(a)] were dissolved in 250 ml of dimethylacetamide, the solution was admixed with 40 gm of methyl iodide and 30 gm of potassium acetate, and the resulting mixture was stirred for 30 minutes at room temperature. Thereafter, the reaction mixture was diluted with 1 liter of water and was then extracted several times with methylene chloride. The combined extracts were dried and evaporated in vacuo, the oily residue was taken up in a small amount of acetonitrile, insoluble crystalline impurities were filtered off, the filtrate was evaporated in vacuo, the residue was dissolved in 300 ml of acetone, 10 gm of sodium iodide were added to the solution, and the resulting mixture was stirred for 20 hours at room temperature. Thereafter, the acetone was evaporated in vacuo, the residue was admixed with water, the aqueous mixture was extracted with ethyl acetate, and the organic extract solution was dried with magnesium sulfate and then evaporated again in vacuo. The residual oil was dissolved in 30 ml of methanol, the solution was admixed with 250 ml of liquid ammonia, and the mixture was allowed to stand for one hour at room temperature. Thereafter, the reaction mixture was poured over ice, the aqueous mixture was neutralized with glacial acetic acid and then extracted with ethyl acetate, the organic extract solution was admixed with activated charcoal, and the mixture was dried and vacuum-filtered. The filtrate was evaporated in vacuo, and the residue was recrystallized from methylene chloride/isopropyl ether, yielding 9.3 gm (41% of theory) of the compound of the formula

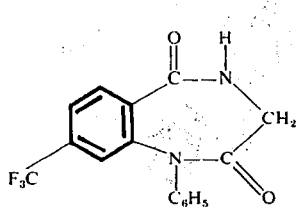

which had a melting point of 249°–251°C.

EXAMPLE 3

8-Chloro-1-phenyl-3H-1,4-benzodiazepine-2,5-(1H,4H)-dione by method B 2.5 gm of 8-chloro-1-phenyl-3,4-dihydro-(2H,5H)-1,4-benzodiazepin-5-one were dissolved in 250 ml of acetone, and the solution was admixed at room temperature with 5 ml of an oxidizing solution which had been prepared by dissolving 2.7 gm of chromium-VI-oxide in 2.3 ml of concentrated sulfuric acid and diluting the solution to 10 ml with distilled water. The reaction mixture was stirred for one hour at room temperature and was then vacuum-filtered through diatomaceous earth. The filter cake was washed with acetone, the filtrate was evaporated in vacuo, and the residue was recrystallized from acetonitrile, yielding 2.4 gm (88% of theory) of the compound of the formula

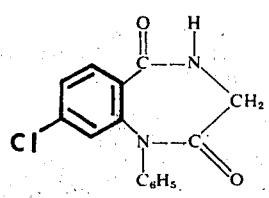

which had a melting point of 244°–245°C.

EXAMPLE 4

Using a procedure analogous to that described in Example 1, 8-bromo-1-phenyl-3H-1,4-benzodiazepine-2,5-(1H, 4H)-dione, m.p. 261°–262°C, of the formula

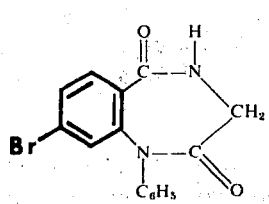

was prepared from N-chloroacetyl-N-phenyl-4-bromo-anthranilic acid.

EXAMPLE 5

Using a procedure analogous to that described in Example 1, 8-bromo-1-(p-bromo-phenyl)-3H-1,4-benzodiazepine-2,5-(1H,4H)-dione, m.p. 280°–281°C, of the formula

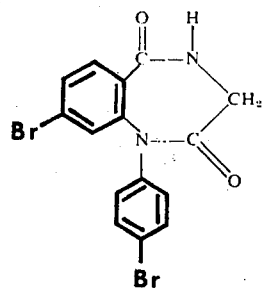

was prepared from N-chloroacetyl-N-(p-bromo-phenyl)-4-bromoanthranilic acid.

EXAMPLE 6

Using a procedure analogous to that described in Example 1, 8-hydroxy-1-phenyl-3H-1,4-benzodiazepine-2,5-(1H, 4H)-dione, m.p. 170°–171°C, of the formula

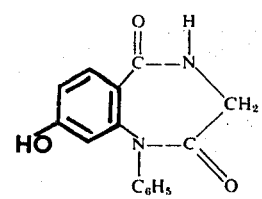

was prepared from N-chloroacetyl-N-phenyl-4-hydroxy-entranilic acid.

EXAMPLE 7

Using a procedure analogous to that described in Example 1, 8-cyano-1-phenyl-3H-1,4-benzodiazepine-2,5-(1H, 4H)-dione, m.p. 155°–157°C (decomp.), of the formula

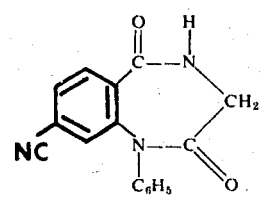

was prepared from N-chloroacetyl-N-phenyl-4-cyano-anthranilic acid.

EXAMPLE 8

Using a procedure analogous to that described in Example 1, 8-amino-1-phenyl-3H-1,4-benzodiazepine-2,5-(1H, 4H)-dione, m.p. 285°–287°C, of the formula

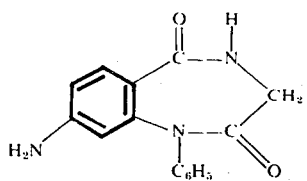

was prepared from N-chloroacetyl-N-phenyl-4-amino-anthranilic acid.

EXAMPLE 9

Using a procedure analogous to that described in Example 1, 8-chloro-1-(o-chloro-phenyl)-3H-1,4-benzodiazepine-2,5-(1H,4H)-dione, m.p. 249°–250°C, of the formula

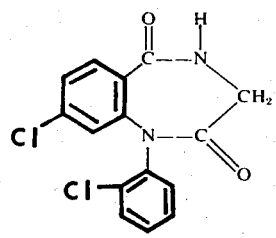

was prepared from N-chloroacetyl-N-(o-choloro-phenyl)-4-chloro-anthranilic acid.

EXAMPLE 10

Using a procedure analogous to that described in Example 1, 8-chloro-1-(o-bromo-phenyl)-3H-1,4-benzodiazepine-2,5-(1H,4H)-dione, m.p. 254°–255°C, of the formula

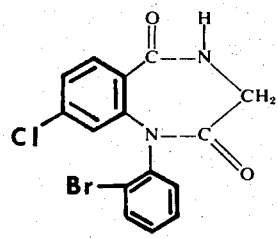

was prepared from N-chloroacetyl-N-(o-bromo-phenyl)-4-chloroanthranilic acid.

EXAMPLE 11

Using a procedure analogous to that described in Example 1, 8-chloro-1-o-fluoro-phenyl)-3H-1,4-benzodiazepine -2,5-(1H,4H)-dione, m.p. 215–216°C, of the formula

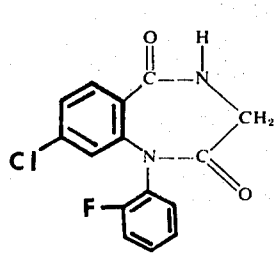

was prepared from N-chloroacetyl-N-(o-fluoro-phenyl)-4-chloro-antrhanilic acid.

EXAMPLE 12

Using a procedure analogous to that described in Example 1, 8-trifluoromethyl-1-(o-chloro-phenyl)-3H-1,4-benzodiazepine-2,5-(1H,4H)-dione, m.p. 256°–257°C, of the formula

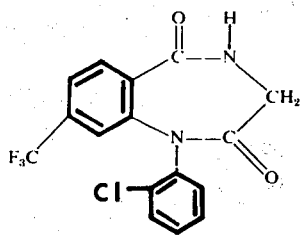

was prepared from N-chloroacetyl-N-(o-chloro-phenyl)-4-trifluoromethyl-anthranilic acid.

EXAMPLE 13

Using a procedure analogous to that described in Example 1, 8-nitro-1-(o-chloro-phenyl)-3H-1,4-benzodiazepine -2,5-(1H,4H)-dione, m.p. 241°–242°C, of the formula

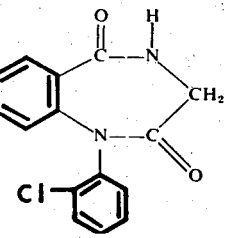

was prepared from N-chloroacetyl-N-(o-chloro-phenyl)-4-nitro-anthranilic acid.

EXAMPLE 14

Using a procedure analogous to that described in Example 1, 8-trifluoromethyl-1(o-fluoro-phenyl)-3H-1,4-benzodiazepine-2,5-(1H,4H)-dione, m.p. 253°–255°C, of the formula

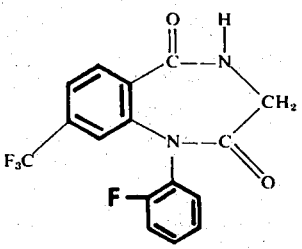

was prepared from N-chloroacetyl-N-(o-fluoro-phenyl)-4-trifluoromethyl-anthranilic acid.

EXAMPLE 15

Using a procedure analogous to that described in Example 1, 8-chloro-1-(o-trifluoromethyl-phenyl)-3H-1,4-benzodiazepine-2,5-(1H,4H)-dione, m.p. 265°–267°C, of the formula

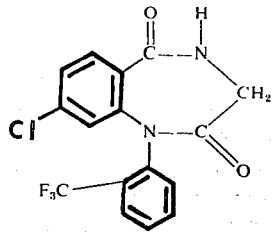

was prepared from N-chloroacetyl-N-(o-trifluoromethyl-phenyl) -4-chloro-anthranilic acid.

The compounds of the present invention, that is those embraced by formula I above, have useful pharmacodynamic properties. More particularly, they exhibit psychosedative (tranquilizing) and anticonvulsive activities in warm-blooded animals, such as mice, rats, dogs and minks.

Particularly effective are those compounds of the formula I wherein $R_1$ is phenyl or halo-phenyl and $R_2$ is chlorine or trifluoromethyl.

While both the psychosedative and the anticonvulsive activities are concurrently present in all of the compounds embraced by formula I, one or the other of these activities may be more pronounced in the individual species. For example, 8-chloro-1-phenyl-3H-1,4-benzodiazepine-2,5-(1H,4H)-dione has a more pronounced tranquilizing activity, while the anticonvulsive effect is more pronounced in 1-phenyl-8-trifluoromethyl-3H-1,4-benzodiazepine-2,5-(1H,4H)-dione.

The toxicity of the compounds of the instant invention is extremely low; the $LD_{50}$ of all of the compounds embraced by formula I is in excess of 2,000 mgm/kg p.o. (mouse). In fact, the $LD_{50}$ of most of the compounds could not be exactly determined because it was physically impossible to administer to the animals the large amount required to ascertain the median lethal dose by conventional methods.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective psychosedative and anticonvulsive dosage unit of the compounds according to the present invention is from 0.0083 to 0.84 mgm/kg body weight, preferably 0.083 to 0.42 mgm/kg body weight. The preferred daily dose rate is from 0.166 to 2.5 mgm/kg body weight.

The following examples illustrate a few dosage unit compositions comprising a compound of the present invention as an active ingredient and represent the best mode contemplated of putting the invention into practical use. The parts are parts by weight unless otherwise specified.

EXAMPLE 16

Coated pills

The pill core composition is compounded from the following ingredients:

| | |
|---|---|
| 8-Chloro-1-phenyl-3H-1,4-benzodiazepine-2,5-(1H,4H)-dione | 5.0 parts |
| Lactose | 28.5 " |
| Corn starch | 15.0 " |
| Gelatin | 1.0 " |
| Magnesium stearate | 0.5 " |
| Total | 50.0 parts |

Preparation:

The benzodiazepine-dione compound, the lactose and the corn starch are intimately admixed with each other, the mixture is moistened with an aqueous 10 % solution of the gelatin, and the moist mass is forced through a 1 mm-mesh screen. The resulting granulate is dried at 40°C and again passed through the screen, the dry granulate is admixed with the magnesium stearate, and the composition is compressed into 50 mgm-pill cores which are subsequently coated with a thin shell consisting essentially of a mixture of sugar, titanium dioxide, talcum and gum arabic and finally polished with beeswax. Each coated pill contains 5 mgm of the benzodiazepine-dione compound and is an oral dosage unit composition with effective tranquilizing and anticonvulsive action.

EXAMPLE 17

Suppositories

The suppository composition is compounded from the following ingredients:

| | |
|---|---|
| 8-Chloro-1-(o-chloro-phenyl)-3H-1,4-benzodiazepine-2,5-(1H,4H)-dione | 5.0 parts |
| Suppository base (e.g. cocoa butter) | 1695.0 " |
| Total | 1700.0 parts |

Preparation:

The finely pulverized benzodiazepine-dione compound is blended with the aid of an immersion homogenizer into the suppository base which had previously been melted and cooled to 40°C. 1700 mgm-portions of the composition are then poured at 35°C into cooled suppository molds and allowed to cool therein. Each suppository contains 5 mgm of the benzodiazepine-dione compound and is a rectal dosage unit composition with effective tranquilizing and anticonvulsive action.

EXAMPLE 18

Tablets

The tablet composition is compounded from the following ingredients:

| | |
|---|---|
| 8-Trifluoromethyl-1-phenyl-3H-1,4-benzodiazepine-2,5-(1H,4H)-dione | 3 parts |
| Lactose | 50 " |
| Corn starch | 32 " |
| Soluble starch | 4 " |
| Magnesium stearate | 1 " |
| Total | 90 parts |

Preparation:

The benzodiazepine-dione compound is admixed with the magnesium stearate, the mixture is granulated with an aqueous solution of the soluble starch, the granulate is dried and intimately admixed with the lactose and the corn starch, and the resulting composition is compressed into 90 mgm-tablets in a conventional tablet making machine. Each tablet contains 3 mgm of the benzodiazepine-dione compound and is an oral dosage unit composition with effective tranquilizing and anticonvulsive action.

Analogous results are obtained when any one of the other benzodiazepine-diones embraced by formula I is substituted for the particular benzodiazepine-dione in Examples 16 through 18. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

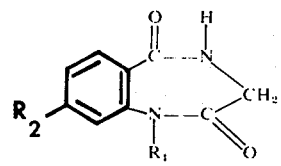

wherein
$R_1$ is phenyl, fluoro-phenyl, chloro-phenyl, bromo-phenyl, trifluoromethyl-phenyl or nitro phenyl, and
$R_2$ is fluorine, chlorine, bromine, trifluoromethyl, nitro, amino, cyano or hydroxyl.

2. The compound of claim 1 which is 1-phenyl-8-trifluoromethyl-3H-1,4-benzodiazephine-2,5-(1H,4H)-dione.

3. The compound of claim 1 which is 8-chloro-1-phenyl-3H-1,4-benzodiazepine-2,5-(1H,4H)-dione.

4. The compound of claim 1 which is 8-chloro-1-(o-chloro-phenyl)-3H-1,4-benzodiazepine-2,5-(1H,4H)-dione.

5. The compound of claim 1 which is 8-chloro-1-(o-fluoro-phenyl)-3H-1,4-benzodiazepine-2,5-(1H,4H)-dione.

* * * * *